(12) United States Patent
Nichols et al.

(10) Patent No.: US 8,788,298 B2
(45) Date of Patent: Jul. 22, 2014

(54) SYSTEMS AND METHODS FOR PROVIDING A SAFE DRIVING AND VEHICLE RELATED ELECTRONIC COMMUNITY

(75) Inventors: Brian Nichols, Cedar Hills, UT (US); Dan Nichols, Pleasant Grove, UT (US); James Nichols, Saratoga Springs, UT (US); Linda Nichols, Orem, UT (US); Russ Nichols, Lake Shore, UT (US)

(73) Assignee: Collision Guard Inc., Orem, UT (US)

( * ) Notice: Subject to any disclaimer, the term of this patent is extended or adjusted under 35 U.S.C. 154(b) by 0 days.

(21) Appl. No.: 13/227,306

(22) Filed: Sep. 7, 2011

(65) Prior Publication Data

US 2012/0059724 A1   Mar. 8, 2012

Related U.S. Application Data

(60) Provisional application No. 61/380,693, filed on Sep. 7, 2010.

(51) Int. Cl.
*G06Q 40/00* (2012.01)

(52) U.S. Cl.
USPC .................................... 705/4; 705/35

(58) Field of Classification Search
USPC ......................................... 705/4, 35
See application file for complete search history.

(56) References Cited

U.S. PATENT DOCUMENTS 7,774,217 B1 * 8/2010 Yager et al. ............... 705/4

* cited by examiner

*Primary Examiner* — Ojo Oyebisi
(74) *Attorney, Agent, or Firm* — David B. Tingey; Kirton McConkie (57) ABSTRACT

An online safe driver community having driving and vehicle related information and services made available to members of the community. A method for covering costs associated with an insurance deductible.

20 Claims, 8 Drawing Sheets

SYSTEMS AND METHODS FOR PROVIDING A SAFE DRIVING AND VEHICLE RELATED ELECTRONIC COMMUNITY

RELATED APPLICATIONS

This application claims the benefit of U.S. Provisional Application No. 61/380,693, filed Sep. 7, 2010, entitled SYSTEMS AND METHODS FOR PROVIDING A SAFE DRIVER AND VEHICLE RELATED ELECTRONIC COMMUNITY, which is incorporated herein in its entirety.

BACKGROUND OF THE INVENTION

1. Field of the Invention

The present invention relates to providing a safe driver and vehicle-related community that supports various services made available to members of the community. In particular, an electronic community is provided to increase the awareness, understanding, and knowledge of the community membership as it relates to vehicle and driving related subjects. A vehicle monitoring system is further provided whereby a user is able to monitor the status of their vehicle's repair and maintenance needs and schedules.

2. Background and Related Art

The responsibility of maintaining a vehicle requires diligence in following manufacturer suggested schedules and routines determined to address normal wear and tear experienced by the vehicle. To the average consumer, this task is burdensome and complicated. Accordingly, many consumers employ the services of trained professionals to monitor and maintain the condition of their vehicles. While such services can be costly and ongoing, consumers recognize the benefits of knowing that the job is being done in a timely and correct manner.

While some consumers would like to maintain and/or repair their own vehicles, failure to follow manufacturer's maintenance schedules may void warranties and other benefits attached to the vehicle. As vehicles become more technologically advanced, repair procedures become more difficult, expensive, and confusing, often requiring a consumer to purchase costly repair manuals, tools, and sometimes a mechanic to finish the repair. Thus, by employing professionals to maintain the condition of their vehicles, consumers are freed from the worry and burden often associated with vehicle maintenance.

Another burden felt by vehicle owners relates to stresses surrounding an accident or other event for which the owner must make an insurance claim. To keep insurance premiums low, vehicle owners commonly purchase minimum insurance with maximum deductibles requirements. Thus, in the event of an accident the vehicle owner provides a deductible payment prior to receiving help from the insurance company. Further, upon making an insurance claim it is likely that the owner's insurance premium increases, thus further diminishing the owner's funds. This process sometimes results in the vehicle owner refraining from making an insurance claim, but rather just accepting and living with the vehicle damage.

Thus, while techniques currently exist that relate to maintaining, repairing and insuring a vehicle, challenges still exist. Accordingly, it would be an improvement in the art to augment or even replace current techniques with other techniques.

SUMMARY OF THE INVENTION

The present invention relates to providing a safe driver and vehicle-related community that supports various services made available to members of the community. In particular, an electronic community is provided to increase the awareness, understanding, and knowledge of the community membership as it relates to vehicle and driving related subjects. A vehicle monitoring system is further provided whereby a user is able to monitor the status of their vehicle's repair and maintenance needs and schedules.

Implementation of the present invention takes place in association with providing a safe driver and vehicle-related community. In some implementations, an electronic or online safe driver community is provided wherein a member gains access to various services and sources of information to aid the member in caring for their vehicle. The online community further provides a membership benefit whereby the online community covers or reimburses deductible costs associated with the member making an insurance claim on the member's vehicle. Additional services include vehicle repair information, vehicle maintenance information, local service provider advertising, and vehicle/driving education content made available to member to increase the member's awareness, understanding, and knowledge as it pertains to owning a vehicle.

Some implementations of the present invention include a method of reimbursing a cost associated with an insurance deductible, the method including steps for providing a safe driver community; providing memberships to the safe driver community; offering a membership benefit to members of the safe driver community, the membership benefit to include coverage of a member's deductible associated with an insurance policy; and covering the member's deductible associated with the insurance policy. Some implementations further include steps for providing the member with a plurality of content, such as educational content, advertising content, vehicle repair content and vehicle maintenance content. The plurality of content may be selected and presented to the member based upon various identifying characteristics of the member, such as the members age, sex, vehicle, and geolocation. The plurality of content may further be selected and presented to the user based upon a maintenance event of the member's vehicle, or in response to an inquiry or search by the member.

In some implementations, the maintenance of the member's vehicle is tracked by the online safe driver community. Thus, the member is notified by the safe driver community of a maintenance event for the member's vehicle. In some implementations, the online safe driver community further provides advertising material to the member based upon maintenance events of the member's vehicle.

Further, in some implementations of the present invention a computer program product is provided for implementing within a computer system a method for reimbursing a cost associated with an insurance deductible, the computer program product comprising: a computer readable medium for providing computer program code means utilized to implement the method, wherein the computer program code means is comprises of executable code for implementing the steps of: providing a safe driver community; providing memberships to the safe driver community; offering a membership benefit to members of the safe driver community, the membership benefit to include coverage of a member's deductible associated with an insurance policy; and covering the member's deductible associated with the insurance policy.

While the methods and processes of the present invention have proven to be particularly useful in the area of vehicle maintenance and/or repair, those skilled in the art can appreciate that the methods and processes can be used in a variety of different applications and in a variety of different areas of manufacture to yield benefits to members for products and/or services in an electronic or online community. Examples of such industries include the healthcare industry, medical industry, fitness industry, recycling industry, environmental or "green" industry, education industry, food industry, grocery industry, cooking industry, hunting industry, outdoor industry, home and garden industry, business management industry, coaching industry, marketing industry, advertising industry, retail industry, or any other industry that provides products and/or services.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

Embodiments of the present invention relate to providing a safe driver and vehicle-related community that supports various services made available to members of the community. In particular, an electronic community is provided to increase the awareness, understanding, and knowledge of the community membership as it relates to vehicle and driving related subjects. A vehicle monitoring system is further provided whereby a user is able to monitor the status of their vehicle's repair and maintenance needs and schedules.

As at least some embodiments of the present invention embrace utilization of a computer device and/or a networked system, the following disclosure is grouped into two subheadings, namely "Representative Operating Environment" and "Providing a Safe driver and Vehicle-Related Community." The utilization of the subheadings is for convenience of the reader only and is not to be construed as limiting in any sense.

Representative Operating Environment

Figure 1:
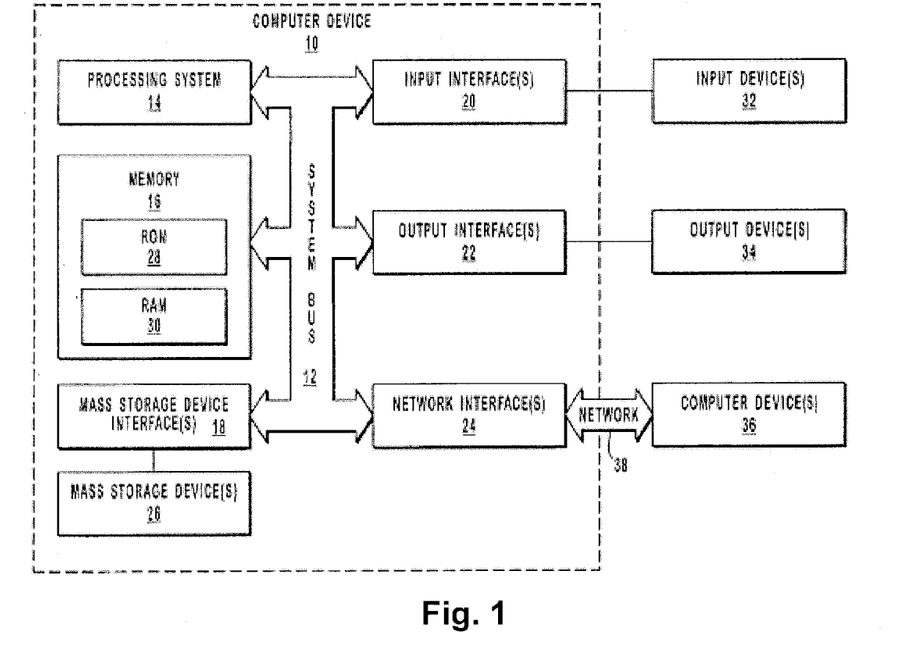
FIG. 1 illustrates a representative system that provides a suitable operating environment for use of embodiments of the present invention.

Since at least some embodiments of the present invention embrace the utilization of a computer system, FIG. 1 and the corresponding discussion are intended to provide a general description of a suitable operating environment in which embodiments of the present invention may be implemented. One skilled in the art will appreciate that embodiments of the present invention may be practiced by one or more computing devices and in a variety of system configurations, including in a networked configuration.

In creating, utilizing and maintaining an electronic community relating to products, information and/or services, embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing embodiments of the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a networked computer system, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include flash drives, hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, or any other device that can be used to input information. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
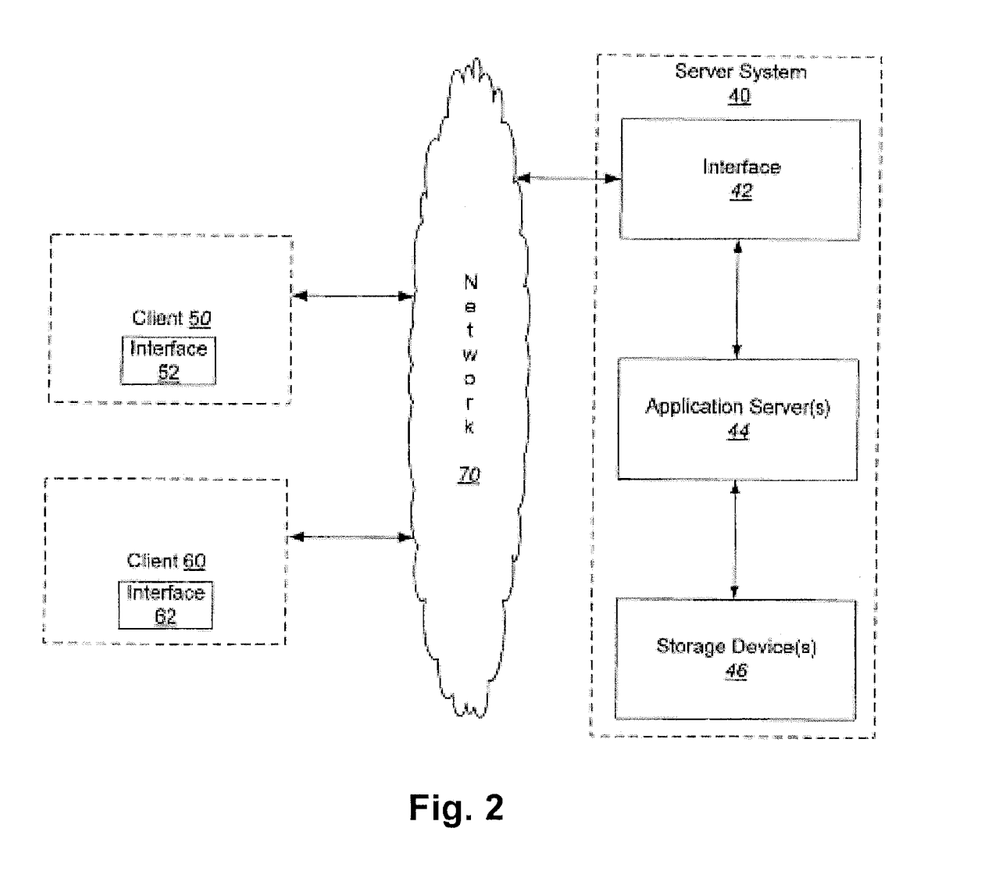
FIG. 2 illustrates a representative networked system.

While those skilled in the art will appreciate that the invention may be practiced in networked computing environments with many types of computer system configurations, FIG. 2 represents an embodiment of the present invention in a networked environment that includes clients connected to a server via a network. While FIG. 2 illustrates an embodiment that includes two clients connected to the network, alternative embodiments include one client connected to a network or many clients connected to a network. Moreover, embodiments in accordance with the present invention also include a multitude of clients throughout the world connected to a network, where the network is a wide area network, such as the Internet.

In FIG. 2, client 50 allows a member to access server system 40 through network 70. System 40 provides information relating to products and/or services that can be accessed by a member through client 50. Client 60 allows a provider of a product and/or service to access server system 40 through network 70. Accordingly, an electronic or safe driver community is created that supports various products and/or services that are made available to members of the online community.

Providing a Safe Driver and Vehicle-Related Community

Embodiments of the present invention relate to an online safe driver community which supports various services made available to members of the online community. In particular, an online community is provided to increase the awareness, understanding, and knowledge of the community membership as it relates to vehicle and driving related subjects. A vehicle monitoring system is further provided whereby a user is able to monitor the status of their vehicle's repair and maintenance needs and schedules.

Figure 3:
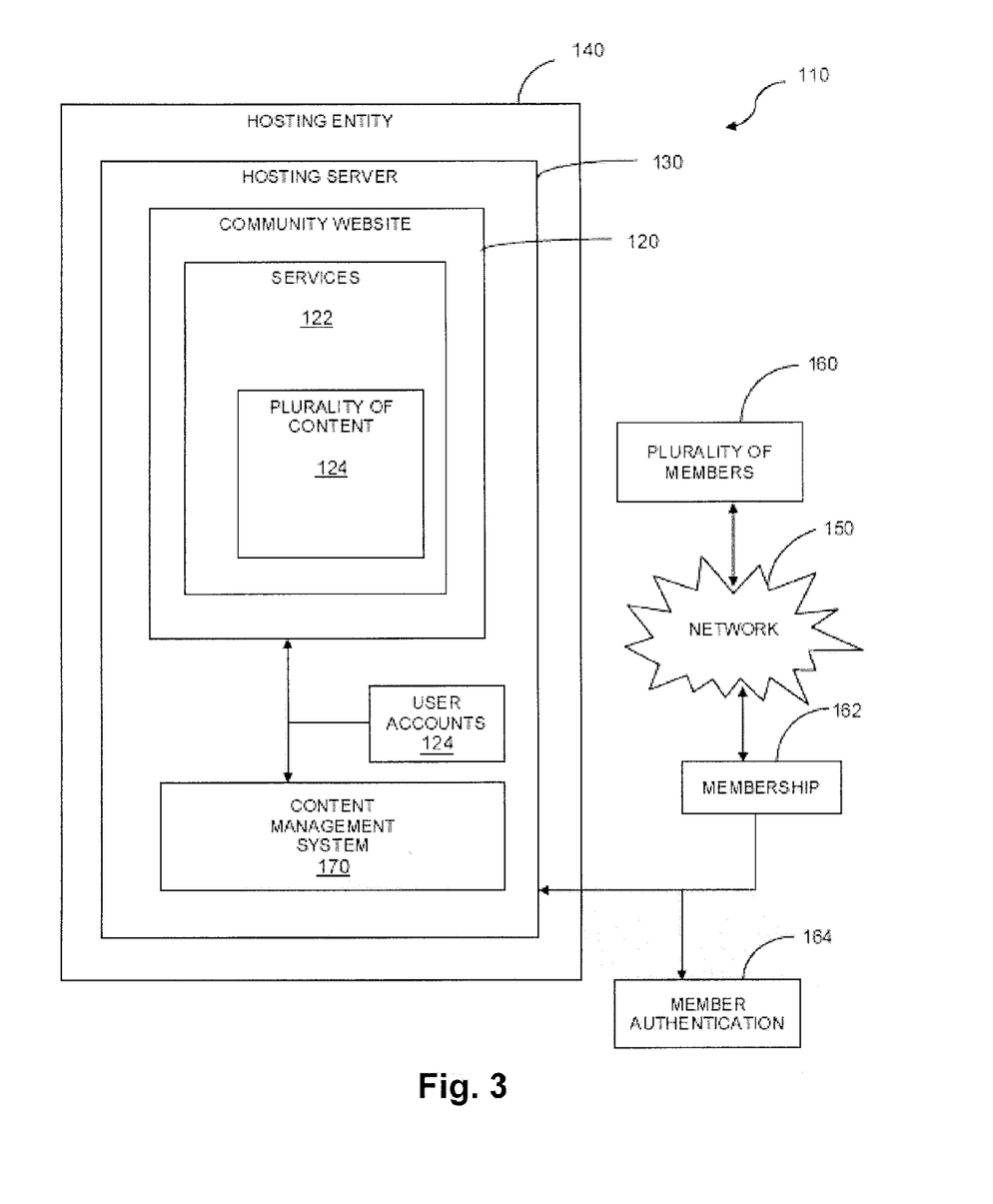
FIG. 3 illustrates a schematic representation of an electronic or online community in accordance with a representative embodiment of the present invention.

Referring now to FIG. 3, a representative embodiment of a system 110 for providing and managing an online safe driver, or vehicle community, is shown. The illustrated embodiment includes a community website 120 hosted on at least one hosting server 130 maintained by a hosting entity 140 and communicatively coupled to a network 150. In some embodiments, the community website 120 is accessible to a plurality of members 160 via hosting server 130. Community website 120 further includes various services 122 having a plurality of content 124, which is managed by a content management system 170.

In some embodiments, a member 160 is permitted to access community website 120 based upon permissions granted through a membership 162. For example, in some embodiments member 160 registers with hosting server 130 thereby gaining access to community website 20. In some embodiments, membership 62 is gratuitously provided to member 160 upon registration with hosting server 130. As a "free member," member 160 may be given limited permissions thereby limiting member's access to plurality of content 124.

In other embodiments, member 160 purchases membership 162 from hosting server 130, thereby receiving permission to access plurality of content 124. In some embodiments, member 160 purchases full permission to access plurality of content 124, while in other embodiments member 160 purchases limited or desired permissions to access limited or desired portions of plurality of content 124.

In some embodiments, community website 120 is password protected 164, either on a homepage and/or any other webpage initially presented to member 160. In other embodiments, single sign-on (SSO) functionality is provided and may be enabled thereby allowing properly-authenticated members 160 complete website content access, without requiring additional passwords or login.

In general, plurality of members 160 access hosting server 130 via network 150. Non-limiting examples of network 150 include the internet, an intranet, an extranet, a local area network, a wide area network, a wired network, a wireless network, a telephone network, or any combination thereof. The at least one hosting server 130 may include any computer or program that provides services to other computers, programs, or users either in the same computer or over a computer network. As non-limiting examples, in some embodiments hosting server 130 includes at least one of an application, communication, mail, database, proxy, fax, file, media, web, peer-to-peer, or standalone server and may use any server format known in the art or developed in the future (possibly a shared hosting server, a virtual dedicated hosting server, a dedicated hosting server, or any combination thereof).

The at least one hosting server 130 may be communicatively coupled to network 150 by any method of network connection known in the art or developed in the future including, but not limited to wired, wireless, modem, dial-up, satellite, cable modem, Digital Subscriber Line (DSL), Asymmetric Digital Subscriber Line (ADSL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), WAN technologies (Ti, Frame Relay), Point-to-Point Protocol over Ethernet (PPPoE, and/or any combinations thereof.

Hosting entity 140 may provide and/or maintain the at least one hosting server 130 and may comprise any individual, entity, or organization. Thus, as non-limiting examples, hosting entity 130 may comprise an individual, an entity, an automated system, a domain name registrar, a domain name registry, a reseller of a domain name registrar, an Internet Service Provider, a software developer, a website designer, a website operator, and any combination thereof.

In some embodiments, the community website 120 is hosted on the at least one hosting server 130 by, as a non-limiting example, subscribing to a hosting provider (e.g., COLLISIONGUARD.COM) for website hosting services (e.g., COLLISIONGUARD's HOSTING PLANS). In other embodiments, community website 120 is hosted on any computer or program that provides services to other computers, programs, or users either in the same computer or over a computer network including, but not limited to, application, communication, mail, database, proxy, fax, file, media, web, peer-to-peer, or standalone servers.

In some embodiments community website 120 provides members 160 access to a user account 126. User account 126 is provided as a user accessible tool for managing user information such as username, password, contact information and community website preferences. In some embodiments, user account 126 further provides tools whereby member 160 can store and update information relating to member's vehicles, vehicle histories, and insurance information. In some embodiments, user account 126 may further provide user options and setting, such as, email preferences, advertising preferences, selection of compatible hand-held or remote electronic device, and information for multiple users under member's account. Thus, once member 160 accesses community website 120, member 160 is permitted to access user account 126 to customize various perimeters relating to member 160 and various services 122 provided by community website 120.

Figure 4:
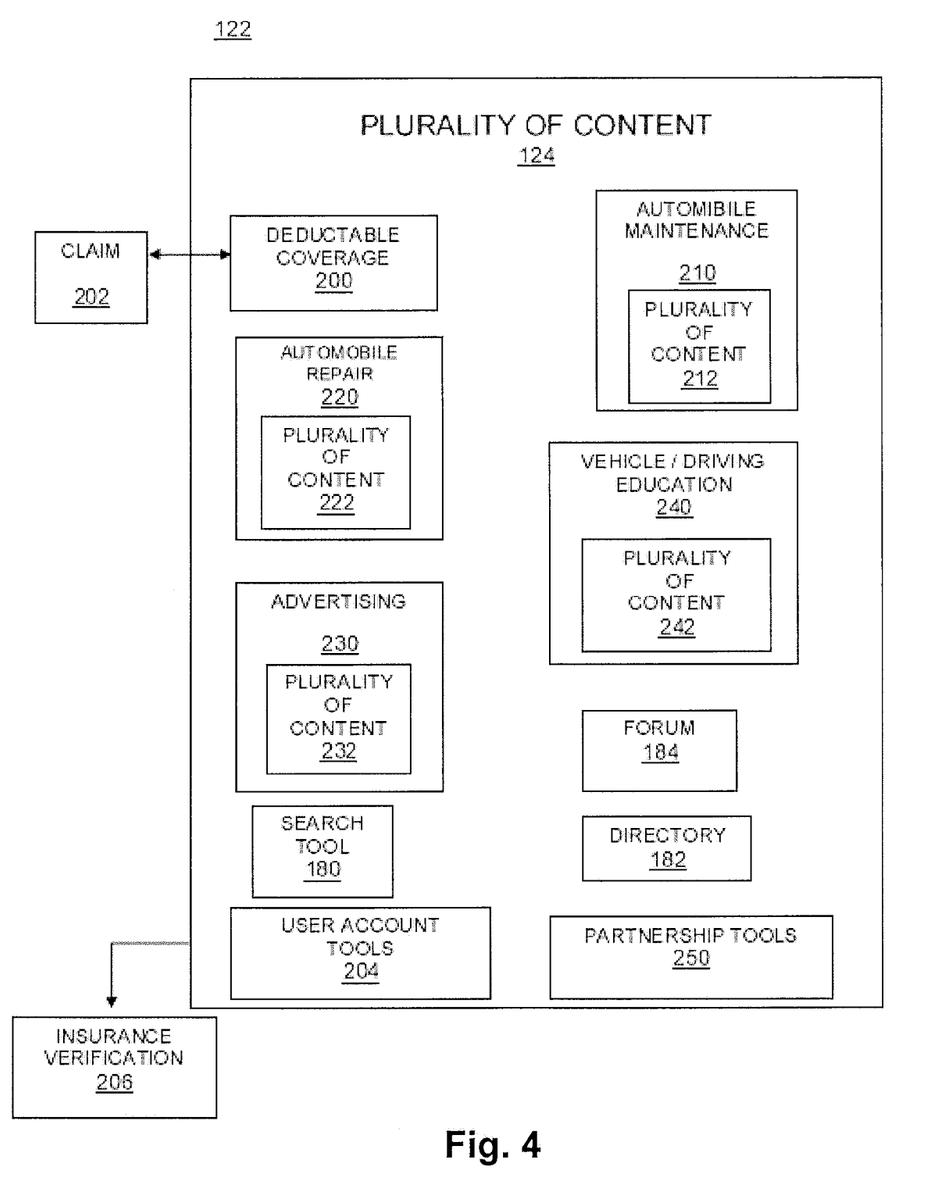
FIG. 4 illustrates a schematic representation of content and services available within an electronic or online community in accordance with a representative embodiment of the present invention.

Referring now to FIG. 4, a more detailed view of plurality of content 124 of services 122 is shown. In some embodiments, services 122 comprise various features, tools, resources, educational content, and information made available to members 160 to increase the awareness, understanding, and knowledge of members 160 as it relates to vehicle and driving related subjects. In some embodiments, plurality of content 124 further includes a search tool 180 to assist members 160 in their efforts to locate particular content. The search tool 180 may comprise a search box in which members 160 enter the keywords to be searched. Search tool 180 may utilize any data search mechanism known in the art or developed in the future including, but not limited to, desktop, network, or online search engines and may utilize, among others, uninformed, list, tree, graph, SQL, tradeoff based, informed, adversarial, constraint satisfaction, string, genetic, sorting, probabilistic, tabu, federated, minimax, and/or ternary search algorithms. Searches of plurality of content 124 may be enabled, perhaps by placing the search box on the homepage, or perhaps on an internet browser's toolbar. By placing the search box on specific webpages, searches limited to the specific content associated with that webpage may be enabled. Alternatively, in some embodiments members 160 are provided with a menu from which they select portions of plurality of content 124 they desire to be searched.

In some embodiments, plurality of content 124 further comprises a directory 182 whereby to assist members 160 in navigating the community website 120. Plurality of content 124 may further include a forum 184 whereby to facilitate communication between plurality of members 160 within community website 120. Still further, in some embodiments plurality of content 124 includes additional services such as deductible coverage 200, user account tools 204, vehicle maintenance 210 and related content 212, vehicle repair 220 and related content 222, advertising 230 and related content 232, vehicle/driving education 240 and related content 242, partnership tools 250, and user account tools 260, each of which is discussed in detail below.

With continued reference to FIG. 4, in some embodiments plurality of content 124 comprises user account tools 204. User account tools 204 are provided as means whereby member 160 can store and monitor personal information relating to member's vehicle. For example, in some embodiments account tools 204 are used to set user preferences for member 160. User preference may include contact preferences, alert notice preferences, email preferences, age, birthdate, education, employment, demographic information, driving record, purchase history, vehicle history, insurance information, marital status, other vehicles owned by member 160, and other personal information.

In some embodiments, account tools 204 provide means whereby vehicle insurance information is stored electronically and made available to member 160 via a remote or wireless device. For example, in some embodiments member's 160 insurance information is entered into account tools 204 and stored as a virtual insurance file, such as a vInsurance file. The vInsurance file is stored within the user account tools and is made available for download to a wireless device designated by member 160. Thus, the vInsurance file may be exchanged wirelessly (e.g., Bluetooth, cellular communication, internet, email) or via a link cord or scan device, in the event that a second party desires to receive the insurance information of member 160. For example, if a collision occurs between two vehicles, the driver of each vehicle will typically exchange insurance information. Traditionally this is done by exchanging physical copies of each party's insurance card or information. With a vInsurance file, the vehicle owners simply exchange insurance information electronically. Further, a vInsurance file may be sent directly to member 160 from member's insurance agent following a change in the policy or a renewal of coverage. In further example, if a third party desired to borrow member's vehicle, the vInsurance file may be electronically transferred to the third party for use during their use of the vehicle. One benefit of an electronic insurance card is that sensitive information about member 160, such as member's home address, is not left in member's vehicle, but rather is carried with member 160.

The concept of vInsurance can be extended to other areas where insurance verification is required, such as with medical insurance. For example, if member 160 visits a new medical clinic and must provide proof of insurance, member 160 may electronically transfer their vInsurance file to the new medical clinic. Alternatively, the vInsurance file may generate a barcode that can be scanned directly from the display of member's 160 handheld device.

With further reference to FIG. 4, in some embodiments plurality of content 124 comprises a deductible coverage service 200. As commonly known in the insurance profession, a deductible is the amount of money which the insured member 160 pays before the insurance company's own coverage plan begins. In practical terms, insurance companies include a deductible in their policies to avoid paying out benefits on relatively small claims. For example, a typical auto insurance policy may carry a $500.00 deductible. Deductable coverage 200 is a service provided to subscribing members 160 whereby hosting server 130 (or another sponsoring entity) refunds members 160 any deductible costs associated with making a claim 202 on their insurance provider. Thus, in the event of an accident, theft, fire, or other qualifying event, member 160 receives funds from the hosting server 130 equal to his or her deductible as stated in their insurance policy. In some embodiments, member 160 receives additional funds to cover repairs not covered by his or her insurance policy. For example, where an insurance adjuster authorizes a partial betterment on a damaged item (i.e., a tire), as opposed to completely replacing the damaged item, deductible coverage service 100 would cover those costs pertaining to member's 160 responsible portion of the betterment. Further, in some embodiments member 160 is provided with a benefits card whereby member 160 presents the benefits card to a service provider as a source of payments for services or products received. Thus, the benefits card covers any out-of-pocket repair costs, as opposed to reimbursing member 160.

In some embodiments, member 160 is required to pay a yearly fee to receive deductible coverage service 200. In other embodiments, member 160 is required to pay a monthly fee to receive deductible coverage service 200. Further, in some embodiments member 160 is required to carry a specified amount of insurance in order to qualify for deductible coverage 200. Still further, in some embodiments member 160 is required to carry insurance having a deductible that is less than a determined amount.

In some embodiments, member 160 may further be required to meet certain perimeters prior to qualifying for deductible coverage service 200. For example, in some embodiments member 160 must have a minimal amount of accidents, traffic citations, and previous insurance claims to qualify for deductible coverage 200. In other embodiments, a membership fee is adjusted based on the driving and insurance histories of member 160.

Figure 5:
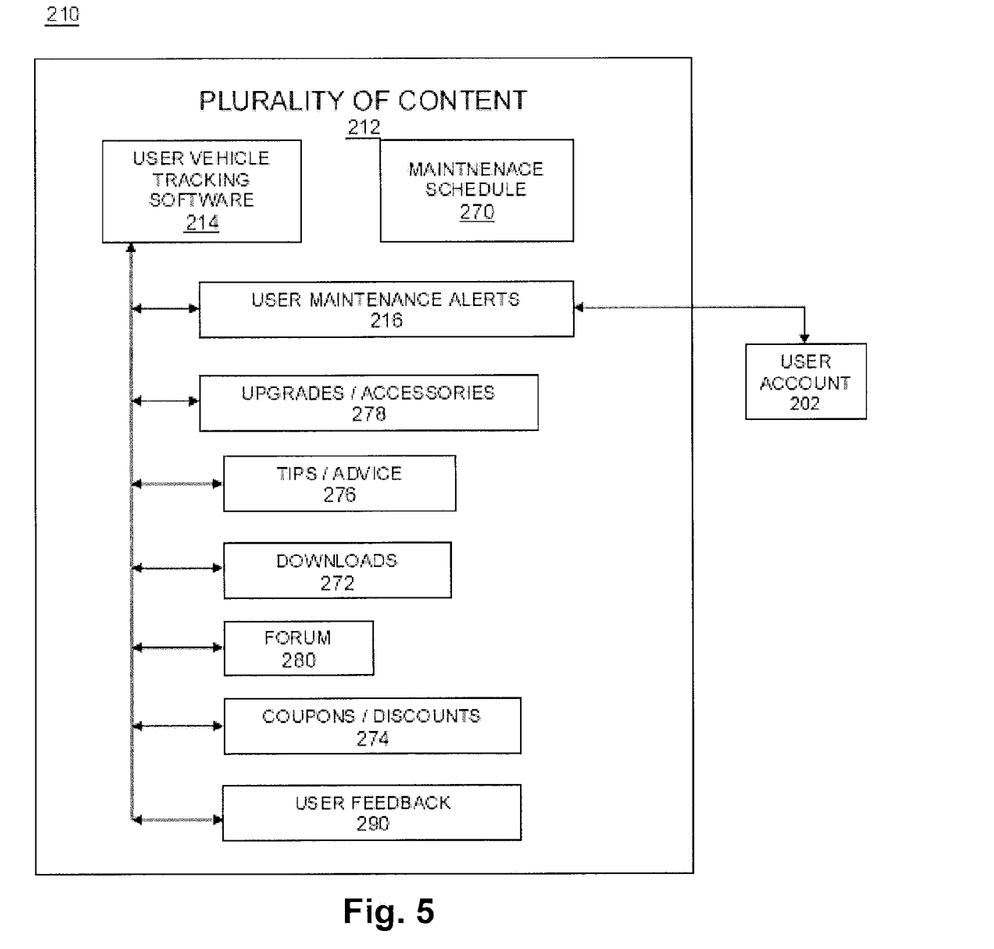
FIG. 5 illustrates a schematic representation of content and services available within a vehicle maintenance service of an online community in accordance with a representative embodiment of the present invention.

Referring now to FIG. 5, in some embodiments plurality of content 124 comprises a vehicle maintenance service 210. Maintenance service 210 comprises plurality of content 212 which contains various features accessible by members 160. For example, in some embodiments plurality of content 212 comprises a user vehicle tracking software 214. Software 214 is accessed by member 160 to monitor various aspects of member's vehicle, based on a manufacturer's recommended maintenance schedule 270 for member's vehicle. For example, in some embodiments software 214 tracks maintenance of the member's vehicle based on vehicle data, such as the vehicle maintenance schedule 270, vehicle's mileage, driving conditions, and codes generated by the vehicle's onboard computer processing unit.

In some embodiment, member 160 accesses software 214 via community website 120 and directly enters the vehicle data into data entry forms or boxes. In other embodiments, member 160 accesses software 214 via a wireless device, such as a cell phone, a smart phone, or a tablet computer, and enters the vehicle data into the necessary entry forms or boxes. For example, the wireless device may access software 214 through an internet connection or a cellular service connection. Alternatively, software 214 may be accessed via an application downloaded onto the wireless device. For example, in some embodiments plurality of content 212 comprises various downloads 272 to facilitate member 160 in accessing the features of software 214. Further, in some embodiments the member's vehicle is equipped with a wireless antenna whereby software 214 is accessed by the vehicle's computer processing unit to automatically update the software 214 with the vehicle data.

The vehicle data is recorded and analyzed by software 214 to determine the maintenance needs of the member's vehicle. In some embodiments, member 160 logs onto hosting server 130 to access software 214 located within community website 120. In some embodiments, software 214 displays the vehicle data such that member 160 may visually determine the maintenance needs of the member's vehicle. In other embodiments, software 214 generates and sends email or text message alerts 216 to member 160 regarding upcoming or past due maintenance events. In some embodiments, software 214 further coordinates and sends email or text message alerts 216 to member 160 regarding local provider coupons, sales or discounts 274 for vehicle related services and/or products.

For example, in some embodiments software 214 coordinates a message alert 216 to include a maintenance event alert (e.g., an oil change) and a local provider coupon 274 for a product or service related to the maintenance event (e.g., an oil change coupon). In another embodiment, software 214 coordinates a message alert 216 to include a maintenance event alert (e.g., an oil change) and tips or advice 276 relating to the maintenance event. Further, in some embodiments software 214 coordinates a message alert 216 to include a maintenance event alert (e.g., an oil change) and upgrades or accessories 278 related to the maintenance event (e.g., a performance oil filter). Still further, in some embodiments software 214 coordinates a message alert 216 to include any additional information or feature 272, 274, 276 and/or 278 determined to be of use to member 160. In some embodiments, member 160 may select a user preference for message alerts 216 and other features of maintenance service 210 via user account 124 of hosting server 130.

In some embodiments, the locale of member 160 or member vehicle is determined via the member's GPS capable hand held device or other GPS service, such as by a GPS module of the member vehicle. The member's locale is then used by software 214 to select provider coupons for products and/or services within reasonable proximity of the member's geographic location. In some embodiments, coupons and discounts service 274 comprises features whereby member 160 can view local, regional, national and/or international prices as a comparison for the local provider's prices.

In some embodiments coupons and discounts service 274 further provides a barcode whereby member 160 may receive the price from the local provider. In some embodiments, member 160 selects and prints a coupon or voucher which contains a scannable barcode. In other embodiments, a digital coupon is sent to the member's handheld device for digital, visual presentation to the local provider. Further, in some embodiments the coupons and discounts service 274 sends a digital barcode to the member's handheld device, whereby the local provider scans the handheld device to read the digital barcode and register the discount.

Additional features of maintenance service 210 include a user forum 280 whereby plurality of members 160 may interact as it relates to the features and services of maintenance service 210. Maintenance service 210 further comprises a user feedback 290 feature whereby member 160 may review member feedback as it relates to maintenance service 210. In particular, in some embodiments members 160 leave feedback for local providers, products and/or services as it relates to maintenance service 210. Thus, member 160 may research a specific provider, product or service based on reviews provided in user feedback 290.

Figure 6:
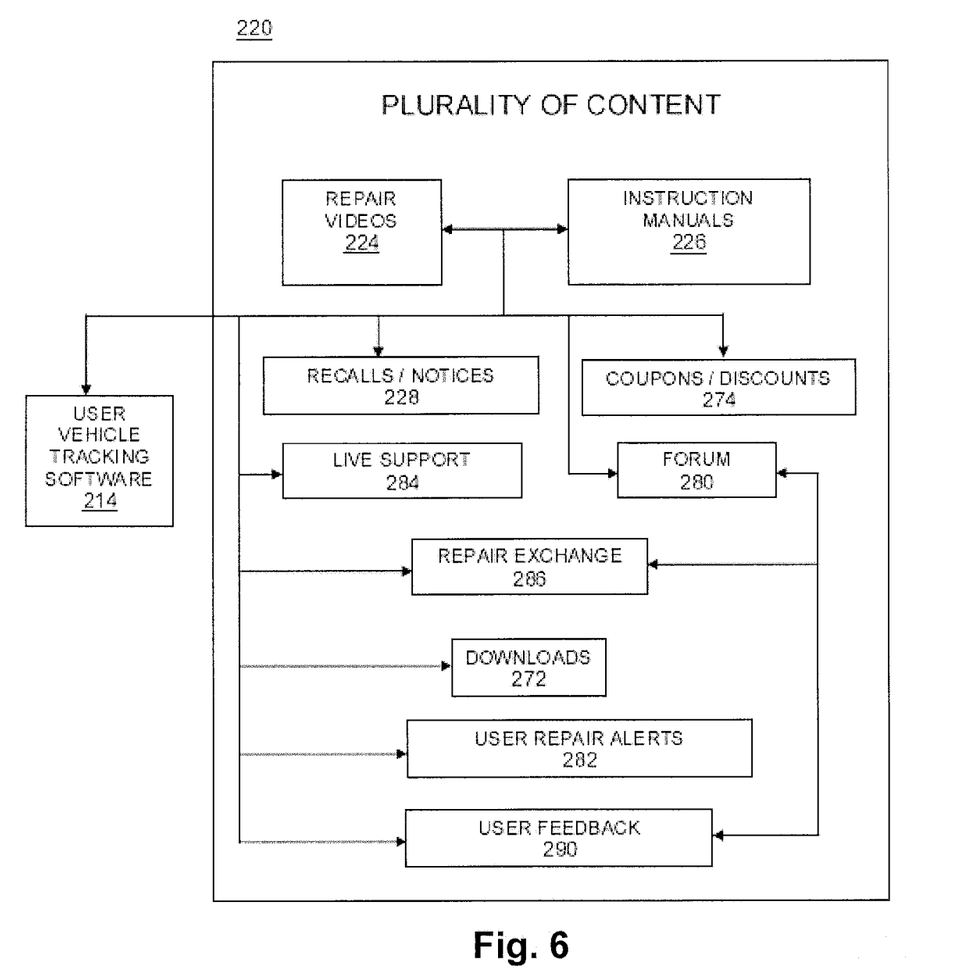
FIG. 6 illustrates a schematic representation of content and services available within a vehicle repair service of an online community in accordance with a representative embodiment of the present invention.

Referring now to FIG. 6, in some embodiments plurality of content 124 comprises a vehicle repair service 220. Repair service 220 comprises plurality of content 222 which contains various features and services accessible by member 160. For example, in some embodiments plurality of content 222 comprises vehicle repair videos 224 and instruction manuals 226. Repair videos 224 generally include audio/visual presentations demonstrating proper procedure and technique for repairing a vehicle. Similarly, instruction manuals 226 generally include written material and illustrations demonstrating proper procedure and technique for repairing a vehicle. In some embodiments, member access is limited to repair videos 224 and instruction manuals 226 relating to member's vehicle. In other embodiments, repair videos 224 and instruction manuals 226 for all makes and models of vehicles are made available to member 160. Such a feature may be desirable where member 160 is a mechanic at a service station or repair shop. In some embodiments, repair videos 224 and instruction manuals 226 further include content relating to maintenance and performance issues, as they relate to a member's vehicle.

In some embodiments, repair service 220 is further linked to user vehicle tracking software 214, whereby vehicle data relating to repairs is received and tracked by software 214. For example, when member 160 accesses a repair video 224 or an instruction manual 226, software 214 receives and stores this information as part of the vehicle data. In some embodiments, software 214 uses the vehicle data to create questions whereby to prompt member 160 through a diagnostic or troubleshooting procedure to identify a problem with the member's vehicle. In some embodiments, software 214 prompts member 160 with questions to determine if a repair has been made, or needs to be made to the member vehicle. Any repair or needed repair is then stored by software 214 as part of the vehicle data and history.

Repair service 220 may further include additional features provided to assist member 160 in repairing or monitoring the status of the member vehicle. For example, in some embodiments repair service 220 further comprises recall and vehicle safety notices 228 specifically pertaining to the member's vehicle. Thus, in the event that a recall or safety notice is issued for the member's vehicle, the notice is made available to member 160 within the notice and recall service 228. In some embodiments, member 160 logs onto hosting server 130 to access recall and safety notice service 228. In other embodiments, software 214 is updated to include recalls and safety notices relating to the member vehicle. As such, member 160 may learn of such notices by accessing software 214 via hosting server 130. Further, in some embodiments, software 214 generates and sends emails or text message alerts 282 regarding vehicle repair issues, such as recalls and safety notices 228. Still further, in some embodiments software 214 analyzes the vehicle data and sends user repair alerts 282 containing coupons and discounts 274 relating to local provider products and services, as discussed above.

With continued reference to FIG. 6, in some embodiment plurality of content 222 further comprises a live support feature 284. In some embodiments, live support feature 284 comprises a portal whereby a local service provider (such as a vehicle mechanic) is made available to member 160 via repair service 220. Member 160 may interface with the local service provider via chat or video chat interactive telecommunication technologies. In some embodiments, hosting server 130 sells blocks of time to local service providers. Thus, the local service provider monitors the live support feature 284 during the purchased block of time. In some instances, a repair exchange feature 286 is provided whereby member 160 lists work or repairs that need to be done to the member vehicle. Local service providers may register with the hosting server 130 and then access the repair exchange 286 to view the member listings. Registered local service providers may then provide bids to complete the requested work in the member listing. In this way, member 160 is able to determine the best deal to acquire the desired product or service. Further, in some embodiments plurality of content 222 includes user feedback 290 and forum 280 services whereby member 160 may receive further education regarding the needed service, product and/or a local service provider's reputation.

In some embodiments, member 160 access repair service 220 via community website 120. In other embodiments, member 160 access repair service 220 via a wireless device, such as a cell phone, a smart phone, or a tablet computer, for example via an internet connection or a cellular service connection. Alternatively, repair service 220 may be access via an application downloaded onto the wireless device. For example, in some embodiments plurality of content 222 comprises various downloads 272 to facilitate member 160 in accessing the various features of repair service 220.

Figure 7:
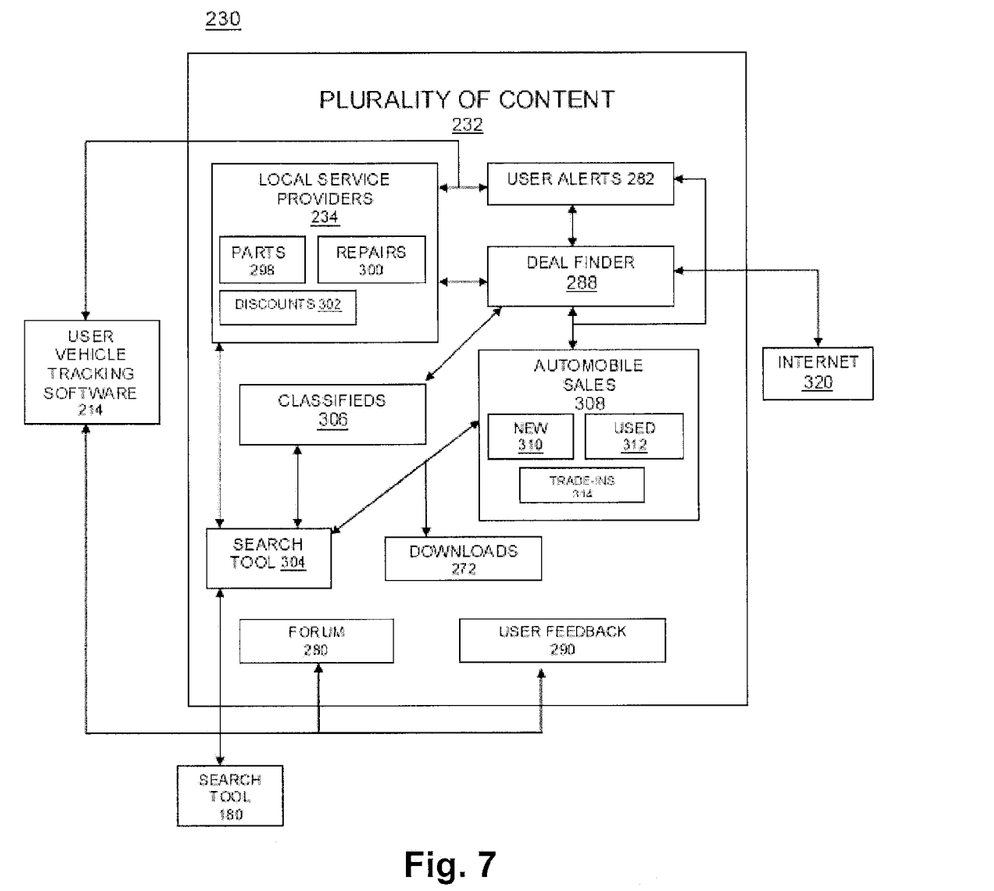
FIG. 7 illustrates a schematic representation of content and services available within advertising service of an online community in accordance with a representative embodiment of the present invention.

Referring now to FIG. 7, in some embodiments plurality of content 124 comprises an advertising service 230. Advertising service 230 comprises plurality of content 232 which contains various features and services accessible by member 160 and local service providers 234. Local service providers 234 generally include merchandisers, manufacturers, repair shops, mechanics, body shops, and other individuals or businesses having a product or service for sale. In some embodiments, a local service provider gains access to advertising services 230 by registering with the hosting service 130 via partnership tools 250. Local service providers 234 provide various information regarding their goods or service (such as parts 298 or repairs 300, respectively) via the membership tools 250. Service providers 234 may further include details regarding discounts or sales 302 for their goods and services.

For example, in some embodiments a service provider 234 offers members 160 a discount in services based upon the member's affiliation with system 110. For example, in some embodiment service provider 234 is an independent insurance agent, wherein the insurance agent offers a discount to the user based upon the user being a member 160.

In some embodiments, advertising services 230 comprises a search tool 304, communicatively coupled to search tool 180 of plurality of content 124, by which member 160 may enter search terms relating to advertising services 230. Search tool 304 is further communicatively coupled to various advertising sources, which may include classifieds 306, vehicle sales 308 of new 310 and used 312 vehicles, and local service providers 234. For example, in some embodiments advertising services 230 includes advertisements for service providers that are licensed to use system 110. Thus, a service provider 234 may be incentivized to be licensed with system 110 as a way to create leads for new customers.

In some embodiments, vehicle sales further include information relating to trade-in values 314 for member's vehicle. Thus, in some embodiments user may access vehicle sales 308 to find a new or used vehicle, and determine a trade-in value for member's vehicle. In other embodiments, vehicle sales 308 monitors member's vehicle data via user vehicle tracking software 214 to determine the likelihood of member's desires to purchase a new or used vehicle. If vehicle sales 308 determines that member 160 may need a new or used vehicle, a user alert 282 is generated by vehicle sales 308 and sent to member 160 via software 214. User alert 282 may include various advertising elements, such as vehicles for sale, vehicle upgrades, recommendations, offers to sell, offers to buy, and trade-in values for the member's vehicle. In some embodiments, vehicle sales 308 further provides a trade-in value for member's vehicle, as well as solicitations from other members 160 to purchase member's vehicle.

In addition to search tool 304, in some embodiments advertising services 230 further includes a deal finder service 288. Deal finder 288 generally comprises a search engine optimized by member 160 to search for advertising within and without community website 120. For example, in some embodiments deal finder 288 is communicatively connected to internal advertising content 232 and external advertising content located on the internet 320. A member 160 optimizes deal finder 288 by entering search perimeter terms, such as, part or service name, genres, price range, features, ownership status, color, size, etc., to focus the search to desired products or services. Deal finder 288 then searches its various advertising content 232 and 320 to determine the best value for member 160. In some embodiments, advertising from local service providers 234 are processed by deal finder 288 prior to generating and send the advertising to member 160 via a user alert 282. Thus, member 160 may compare the local service provider's 234 deal to those available elsewhere within and without the community website 120. Additional features, such as user feedback 290, forum 280 and downloads 272 may be further provided to member 160 as part of advertising services 230.

In some embodiments, system 110 provides opportunities for reciprocal advertising, wherein a first service provider advertises the services of a second service provider in exchange for the second service provider advertising the services of the first service provider. For example, an insurance agent may advertise auto repair services of an auto mechanic in exchange for the auto mechanic's advertisement of the insurance agent's services. In some embodiments, the auto mechanic may offer the insurance agent's customers a discount based upon their affiliation with the insurance agent. Thus, the auto mechanic receives increased customer volume based upon his affiliation with the insurance agent. Alternatively, the insurance agent may offer discounts for customers of the auto mechanic, wherein the cost of the discount is offset by increased customer volume from the auto mechanics customers.

In some embodiments, system 110 provides service providers 234 with various options for lifecycle marketing. For example, in some embodiments service providers 234 are permitted to create their own coupon or deal which is then distributed to member 160 as an advertisement. In some embodiments, a service provider 234, such as a vehicle insurance agent, may log into system 110 and create their own coupon or deal. Service provider 234 may then select the breadth of distribution of the coupon based upon the geolocation of member 160. For example, service provider 234 may intend to limit the coupon or deal to a specific geographical area, such as a state or a city. Service provider 234 may further intend to limit the coupon or deal to a specific member demographic, such as age, sex, marital status, etc. Thus, a service provider 234 may be incentivized to purchase a membership or pay a fee to advertise their services on system 110.

In other embodiments, service providers 234 are provided with tools whereby to automatically create a lifecycle email message to desired or qualifying members 160. For example, in some embodiments service provider 234 is presented with an email message form which includes various user-fillable fields. In some embodiments, service provider 234 fills the various user-fillable fields with various items selected from plurality of content 124.

For example, in some embodiments the user-fillable fields are populated by service provider 234 selecting desired content from a drop-down menu or list containing plurality of content 124. In other embodiments, the user-fillable fields are automatically filled with plurality of content 124 by system 110 based upon a demographic or other identifying feature or features of members 160 selected or indicated by service provider 234. For example, system 110 may select advertising content 232 based upon the genre of service provided by service provider 234. Further, in some embodiments, system 110 selects advertising content 232 or video content based upon additional content 124 selected by service provider 234 for inclusion in the lifecycle marketing material. Alternatively, system 110 may select driving education content 242 based upon a demographic of the member 160 selected by service provider 234. Further still, in some embodiments service provider 234 populates one or more of the various user-fillable fields with unique content, such as an advertisement or other plurality of content provided by the service provider 234.

Once the email form has been populated by the service provider 234 and/or system 110, a lifecycle email message is automatically generated by system 110. In some embodiments, recipient members are selected by system 110 based upon qualifying features or demographics selected by service provider 234. In other embodiments, recipient members are selected by service provider 234. For example, in some embodiments recipient members are selected based upon a contacts list which is maintained by service provider 234. In other embodiments, recipient members are selected based upon the member's 160 user preferences for receiving the type of content included in the lifecycle email message. Further still, in some embodiments recipient members are selected based upon a member's 160 subscription to the service provider's 234 webpage, services or email messages.

Some of the benefits of the presently disclosed systems for lifecycle marketing include the automatic generation and population of content for the desired form of lifecycle marketing. The present systems eliminate the timely and costly processes of generating content for inclusion in lifecycle marketing material. Rather, the service provider 234 need only select the type and kinds of content to be included in the lifecycle marketing material. Once selected, the system 110 automatically formats and presents the selected content in a professional lifecycle email or other desired marketing form. In some embodiments, system 110 further tracks the history of content used by service provider 234, thereby preventing the inclusion of materials which have been previously sent to recipient members 160.

In some embodiments, messages, newsletters, mailers and other types of lifecycle marketing materials created through system 110 include contact information for service provider 234. These marketing materials further include a message which indicates that the marketing material was created by the service provider 234 via system 110. Thus, these marketing materials provide advertising for both service provider 234 and system 110.

Figure 8:
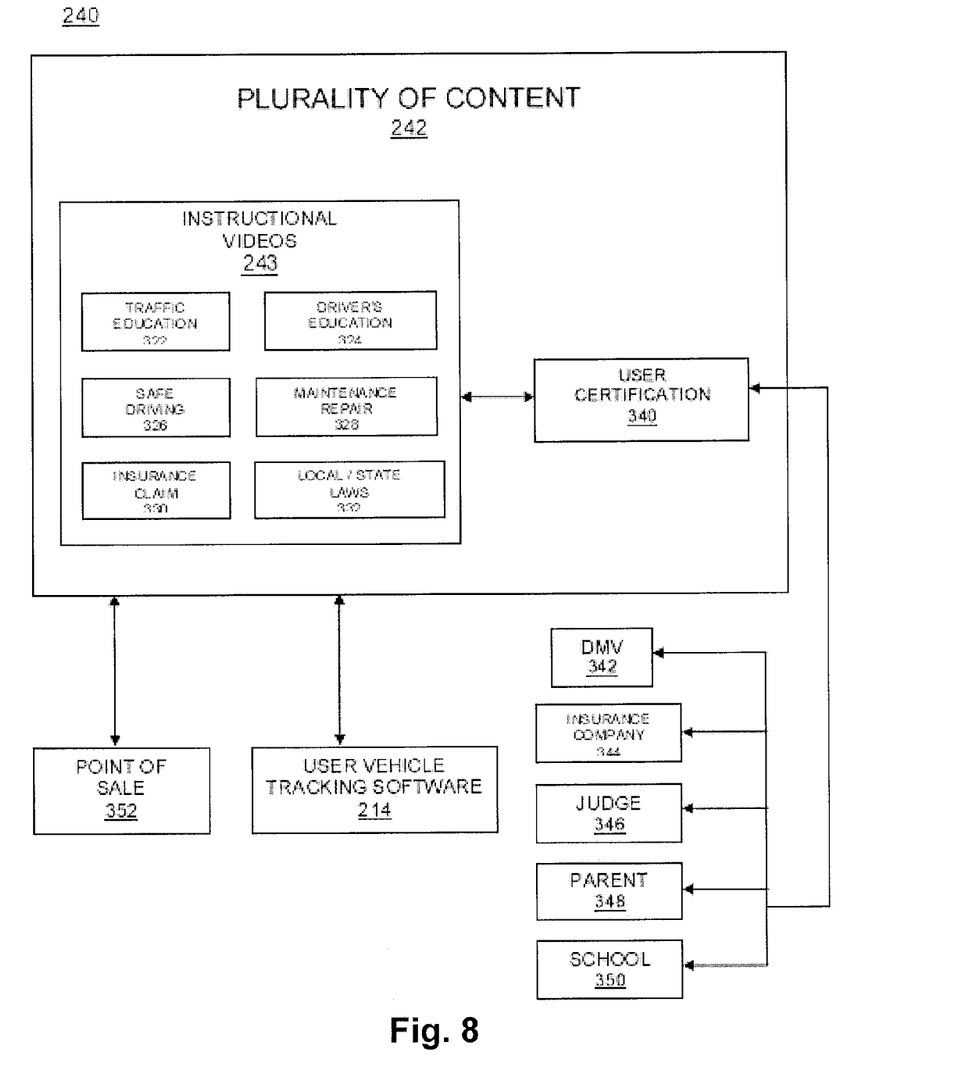
FIG. 8 illustrates a schematic representation of content and services available within a vehicle and driving education service of an online community in accordance with a representative embodiment of the present invention.

Referring now to FIG. 8, in some embodiments plurality of content 124 comprises vehicle and driving education services 240. Vehicle education services 240 comprise plurality of content 242 which contains various features accessible by member 160. For example, in some embodiments plurality of content 242 comprises instruction videos 243. Instructional videos 243 may include videos covering a variety of educational topics, such as traffic education 322, driver's education 324, safe driver instruction 326, vehicle maintenance and repair 328, insurance claim avoidance 330, and state/local law instruction 332. In some embodiments, instructional videos 243 are provided as a voluntary benefit to increase the knowledge, skill or technique of member 160. In other embodiments, member 160 completes a video or video course in exchange for a benefit, such as an auto insurance discount or other benefit to the member 160. In some embodiments, member 160 completes a video or video course in exchange for points which may be used by the member to purchase discounts or other desired benefits offered to member 160. In other embodiments, member 160 completes a quiz following a video or video course, wherein member 160 receives points in exchange for correctly answering questions about the video or video course.

Further, in some embodiments member 160 completes a video or video course to satisfy a requirement, such as in fulfillment of a traffic school requirement or driver's education requirement. Thus, member 160 is able to receive the requisite education without having to travel to a distant location, such as the DMV or a classroom. Upon completion of the video or video course, member 160 receives a user certification 340 providing proof of completion. In some embodiments, education services 240 provides a copy of the user certification 340 to a third party, such as the DMV 342, an insurance company or agent 344, a judge 346, a parent 348 and/or a school or school counselor or instructor 350. In other embodiments, member 160 may print or otherwise provide a copy of the user certification 340.

In some embodiments, an insurance company 344 may require an insured member 160 to complete an instructional video course, such as insurance claim avoidance video course 330, following an insurance claim, such as an accident, theft, or broken windshield. The video course may be offered as an alternative to member 160 losing their insurance coverage. The video course 330 may provide helpful instruction on how to prevent future events leading to future insurance claims.

Further, in some embodiments instructional videos 243 are provided at point of sale locations 352, such as gas pump video monitors. Instructional videos 243 may provide tips about safe driver 326, maintenance 328, local laws 332, and/or other driving related topics. In some embodiments, a service provider 234 sponsors an instructional video 242 in exchange for an advertising segment at the beginning, middle or end of the video segment. Point of sale locations 352 may further include auto parts stores, repair shops, body shops, DMV, and other locations where a driver is available to watch a video segment.

Thus, as discussed herein, the embodiments of the present invention embrace providing a safe driver and vehicle-related community that supports various services made available to members of the community. In particular, an electronic community is provided to increase the awareness, understanding, and knowledge of the community membership as it relates to vehicle and driving related subjects. A vehicle monitoring system is further provided whereby a user is able to monitor the status of their vehicle's repair and maintenance needs and schedules.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method, implemented by one or more processors of a computer system, of reimbursing a cost associated with an insurance deductible, the method comprising:
   providing an online safe driver community including providing a website through which individuals register to be members of the safe driver community, the safe driver community including a reimbursement program for reimbursing an individual for the payment of an insurance deductible to an insurance company;
   receiving, by the one or more processors, a plurality of requests from individuals requesting to join the online safe driver community, wherein the requests include a payment of a fee to enroll in the reimbursement program, and wherein at least one of the individuals receives insurance coverage from a different insurance company than at least one other individual;
   receiving, by the one or more processors, a request from a first individual enrolled in the reimbursement program, the request requesting that a payment of an insurance deductible be reimbursed, the payment being made by the first individual to a first insurance company from which the first individual receives insurance covering the first individual's vehicle; and
   sending, by the one or more processors, an amount of money to reimburse the first individual for the payment of the insurance deductible to the first insurance company, the amount of money being at least a portion of the amount of the insurance deductible paid by the first individual.

2. The method of claim 1, wherein the amount of money sent to the first individual is obtained at least partially from the fees paid by the individuals to enroll in the reimbursement program.

3. The method of claim 1, further comprising:
prior to enrolling an individual in the reimbursement program, determining, by the one or more processors, that the individual's insurance coverage includes a deductible below a specified amount.

4. The method of claim 1, wherein the amount of money sent to the first individual is based on the amount of money paid by the first individual to enroll in the reimbursement program.

5. The method of claim 1, further comprising:
prior to enrolling an individual in the reimbursement program, determining, by the one or more processors, that the individual is qualified for the reimbursement program based on the number of accidents or traffic citations the individual has been in.

6. The method of claim 1, further comprising:
receiving, from a member of the safe driver community, information about the member's vehicle; and
providing content to the member that is customized based on the information about the member's vehicle.

7. The method of claim 6, wherein the customized content comprises one or more of:
maintenance information based on the manufacturer's recommendations for the member's vehicle; or
repair information based on member supplied information that is specific to the member's vehicle.

8. The method of claim 7, wherein the repair information is based on usage information of the member's vehicle.

9. The method of claim 7, wherein the repair information is based on diagnostics of the member's vehicle provided by the member.

10. The method of claim 1, further comprising:
providing, via the website, safe driving information to a member of the safe driver community.

11. The method of claim 7, wherein the repair information is based on content that the member has viewed within the online safe driver community.

12. The method of claim 11, wherein the content that the member has viewed comprises one or more repair videos.

13. The method of claim 1, further comprising:
providing, via the website, live support to members of the safe driver community, wherein the live support is provided by one or more mechanics.

14. The method of claim 13, wherein the one or more mechanics are located within a specified proximity of a member requesting live support.

15. The method of claim 6, wherein providing the content to the member that is customized based on the information about the member's vehicle comprises sending one or more communications to a portable computing device of the member.

16. One or more non-transitory computer storage media storing computer executable instructions which when executed by one or more processors implement a method for reimbursing a cost associated with an insurance deductible, the method comprising:
providing an online safe driver community including providing a website through which individuals register to be members of the safe driver community, the safe driver community including a reimbursement program for reimbursing an individual for the payment of an insurance deductible to an insurance company;
receiving, by the one or more processors, a plurality of requests from individuals requesting to join the online safe driver community, wherein the requests include a payment of a fee to enroll in the reimbursement program, and wherein at least one of the individuals receives insurance coverage from a different insurance company than at least one other individual;
receiving, by the one or more processors, a request from a first individual enrolled in the reimbursement program, the request requesting that a payment of an insurance deductible be reimbursed, the payment being made by the first individual to a first insurance company from which the first individual receives insurance covering the first individual's vehicle; and
sending, by the one or more processors, an amount of money to reimburse the first individual for the payment of the insurance deductible to the first insurance company, the amount of money being at least a portion of the amount of the insurance deductible paid by the first individual.

17. The one or more non-transitory computer storage media of claim 16, wherein the amount of money sent to the first individual is obtained at least partially from the fees paid by the individuals to enroll in the reimbursement program.

18. The one or more non-transitory computer storage media of claim 16, wherein the method further comprises:
prior to enrolling an individual in the reimbursement program, determining, by the one or more processors, that the individual's insurance coverage includes a deductible below a specified amount.

19. The one or more non-transitory computer storage media of claim 16, wherein the amount of money sent to the first individual is based on the amount of money paid by the first individual to enroll in the reimbursement program.

20. The one or more non-transitory computer storage media of claim 16, wherein the method further comprises:
receiving, from a member of the safe driver community, information about the member's vehicle; and
providing content to the member that is customized based on the information about the member's vehicle.

* * * * *